US011983625B2

(12) United States Patent
Ahuja et al.

(10) Patent No.: US 11,983,625 B2
(45) Date of Patent: May 14, 2024

(54) ROBUST MULTIMODAL SENSOR FUSION FOR AUTONOMOUS DRIVING VEHICLES

(71) Applicant: Intel Corporation, Santa Clara, CA (US)

(72) Inventors: Nilesh Ahuja, Cupertino, CA (US); Ignacio J. Alvarez, Portland, OR (US); Ranganath Krishnan, Hillsboro, OR (US); Ibrahima J. Ndiour, Portland, OR (US); Mahesh Subedar, Laveen, AZ (US); Omesh Tickoo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 812 days.

(21) Appl. No.: 16/911,100

(22) Filed: Jun. 24, 2020

(65) Prior Publication Data

US 2020/0326667 A1    Oct. 15, 2020

(51) Int. Cl.
*G06N 3/08* (2023.01)
*G05B 13/02* (2006.01)
*G06F 18/2431* (2023.01)
*G06F 18/25* (2023.01)
*G06N 5/046* (2023.01)
*G06N 7/01* (2023.01)

(52) U.S. Cl.
CPC ............. *G06N 3/08* (2013.01); *G05B 13/026* (2013.01); *G05B 13/027* (2013.01); *G06F 18/2431* (2023.01); *G06F 18/251* (2023.01); *G06N 5/046* (2013.01); *G06N 7/01* (2023.01)

(58) Field of Classification Search
CPC .... G06N 3/04; G06N 3/08; G06F 5/06; G06F 5/10; G06F 7/78; G06F 7/785; G06F 9/30131; G06F 9/30032; G06F 9/30
See application file for complete search history.

(56) References Cited

U.S. PATENT DOCUMENTS

| | | | |
|---|---|---|---|
| 2004/0024750 A1* | 2/2004 | Ulyanov | G06N 10/00 |
| 2019/0354797 A1 | 11/2019 | Nesta et al. | |
| 2020/0005127 A1* | 1/2020 | Baum | G06F 7/785 |
| 2020/0133281 A1 | 4/2020 | Gomez Gutierrez et al. | |
| 2022/0121691 A1* | 4/2022 | Barathi | G06N 3/048 |

OTHER PUBLICATIONS

Subedar, M., Krishnan, R., Meyer, P.L., Tickoo, O. and Huang, J, "Uncertainty aware audiovisual activity recognition using deep Bayesian variational inference", In Proceedings of International Conference on Computer Vision (ICCV 2019).

(Continued)

*Primary Examiner* — John Kwon
(74) *Attorney, Agent, or Firm* — Banner & Witcoff Ltd.

(57) ABSTRACT

Techniques are disclosed for using neural network architectures to estimate predictive uncertainty measures, which quantify how much trust should be placed in the deep neural network (DNN) results. The techniques include measuring reliable uncertainty scores for a neural network, which are widely used in perception and decision-making tasks in automated driving. The uncertainty measurements are made with respect to both model uncertainty and data uncertainty, and may implement Bayesian neural networks or other types of neural networks.

21 Claims, 6 Drawing Sheets

(56) References Cited

OTHER PUBLICATIONS

Singh, A. K., Kumar, B., Singh, S. K., Ghrera, S. P., & Mohan, A. (2018). Multiple watermarking technique for securing online social network contents using back propagation neural network. future generation computer systems, 86, 926-939.
Gal, Y. and Ghahramani, Z. (2016). Dropout as a Bayesian approximation: Representing model uncertainty in deep learning. In international conference on machine learning, pp. 1050-1059.
Kendall, A. and Gal, Y. (2017). What uncertainties do we need in Bayesian deep learning for computer vision? In Advances in neural information processing systems, pp. 5574-5584.
Hendrycks, D. and Gimpel, K. (2017). A baseline for detecting misclassified and out-of-distribution examples in neural networks.
Liang, S., Li, Y., and Srikant, R. (2018). Enhancing the reliability of out-of-distribution image detection in neural networks.
Lee, K., Lee, K., Lee, H., and Shin, J. (2018). A simple unified framework for detecting out-of-distribution samples and adversarial attacks. In Advances in Neural Information Processing Systems, pp. 7167-7177.
Claude E Shannon. A mathematical theory of communication. Bell system technical journal, 27(3):379-423, 1948.
Neil Houlsby, Ferenc Huszár, Zoubin Ghahramani, and Máté Lengyel. Bayesian active learning for classification and preference learning. arXiv preprint arXiv:1112.5745, 2011.
Jacobs, et al "Adaptive Mixtures of Local Experts", Neural Computation 3, 79-87, 1991 Massachusetts Institute of Technology.
Ahuja et al, "Probabilistic Modeling of Deep Features for Out-of Distribution and Adversarial Detection", 4th Workshop on Bayesian Deep Learning (NeurIPS 2019), Vancouver, Canada, 5 pages.
Tian Junjiao et al: "UNO: Uncertainty-aware Noisy-Or Multimodal Fusion for Unanticipated Input Degradation", 2020 IEEE International Conference on Robotics and Automation (ICRA), IEEE, May 31, 2020 (May 31, 2020), pp. 5716-5723, XP033826604, DOI: 10.1109/ICRA40945.2020.9197266 [retrieved on Sep. 14, 2020].
Lee Keuntaek et al: "Ensemble Bayesian Decision Making with Redundant Deep Perceptual Control Policies", 2019 18th IEEE International Conference on Machine Learning and Applications (ICMLA), IEEE, Dec. 16, 2019 (Dec. 16, 2019), pp. 831-837, XP033719811, DOI: 10.1109/ICMLA.2019.00145 [retrieved on Feb. 13, 2020].
Oier Mees et al: "Choosing Smartly: Adaptive Multimodal Fusion for Object Detection in Changing Environments", arxiv.org, Cornell University Library, 201 Olin Library Cornell University Ithaca, NY 14853, Jul. 18, 2017 (Jul. 18, 2017), XP081560832, DOI: 10.1109/IROS.2016.7759048.
European Search Report dated Dec. 23, 2021, Application No. 20214413.5.

* cited by examiner

AUPR (%) scores from three different density functions: GMM, Sep (Gaussian with separate covariance per class), Tied (Gaussian with tied covariance). Best values are shown in bold.

| MNIST | FashionMNIST | | | EMNIST | | | FGSM, $\epsilon = 0.2$ | | |
|---|---|---|---|---|---|---|---|---|---|
| | GMM | Sep | Tied | GMM | Sep | Tied | GMM | Sep | Tied |
| Layer 0 | 86.4 | 84.8 | 81.8 | 66.5 | 61.1 | 53.4 | 96.0 | 95.3 | 94.8 |
| Layer 1 | 84.5 | 81.3 | 53.5 | 67.5 | 72.8 | 65.4 | 96.4 | 95.3 | 88.0 |
| Layer 2 | 88.4 | 90.9 | 58.1 | 72.0 | 77.7 | 58.1 | 97.7 | 97.7 | 86.1 |

| CIFAR10 (Resnet) | SVHN | | | LSUN | | | FGSM, $\epsilon = 0.1$ | | |
|---|---|---|---|---|---|---|---|---|---|
| | GMM | Sep | Tied | GMM | Sep | Tied | GMM | Sep | Tied |
| Layer 0 | 64.4 | 62.8 | 56.0 | 94.9 | 93.8 | 91.5 | 92.5 | 90.7 | 89.8 |
| Layer 1 | 57.9 | 68.8 | 68.0 | 95.1 | 94.9 | 93.4 | 93.2 | 92.8 | 92.4 |
| Layer 2 | 8.77 | 8.75 | 7.17 | 93.4 | 93.5 | 86.8 | 89.3 | 89.2 | 84.4 |

| CIFAR10 (Densenet) | SVHN | | | LSUN | | | FGSM, $\epsilon = 0.1$ | | |
|---|---|---|---|---|---|---|---|---|---|
| | GMM | Sep | Tied | GMM | Sep | Tied | GMM | Sep | Tied |
| Layer 0 | 79.1 | 77.2 | 79.6 | 29.5 | 28.9 | 21.9 | 85.8 | 86.1 | 84.6 |
| Layer 1 | 86.8 | 85.6 | 75.9 | 77.7 | 80.4 | 79.3 | 90.6 | 90.2 | 87.0 |
| Layer 2 | 80.4 | 80.4 | 57.1 | 37.2 | 37.2 | 27.1 | 87.2 | 87.2 | 78.1 |

FIG. 5

AUROC scores (%) from three different density functions: GMM, Sep (Gaussian with separate covariance per class), Tied (Gaussian with tied covariance). Best values are shown in bold.

| MNIST | FashionMNIST | | | EMNIST | | | FGSM $\epsilon = 0.2$ | | |
|---|---|---|---|---|---|---|---|---|---|
| | GMM | Sep | Tied | GMM | Sep | Tied | GMM | Sep | Tied |
| Layer 0 | 92.9 | 91.8 | 92.1 | 94.0 | 93.2 | 91.9 | 87.2 | 85.9 | 84.4 |
| Layer 1 | 92.9 | 93.5 | 75.3 | 96.2 | 96.3 | 93.4 | 88.6 | 85.7 | 66.8 |
| Layer 2 | 97.0 | 97.5 | 89.0 | 96.7 | 97.2 | 93.1 | 92.0 | 92.0 | 62.6 |

| CIFAR10 (Resnet) | SVHN | | | LSUN | | | FGSM $\epsilon = 0.1$ | | |
|---|---|---|---|---|---|---|---|---|---|
| | GMM | Sep | Tied | GMM | Sep | Tied | GMM | Sep | Tied |
| Layer 0 | 78.2 | 80.8 | 79.8 | 94.0 | 93.1 | 90.0 | 91.0 | 89.0 | 87.9 |
| Layer 1 | 75.3 | 82.9 | 84.3 | 94.0 | 94.2 | 92.3 | 92.5 | 91.9 | 91.8 |
| Layer 2 | 75.7 | 82.9 | 84.3 | 93.0 | 93.1 | 85.6 | 92.3 | 92.3 | 89.9 |

| CIFAR10 (Densenet) | SVHN | | | LSUN | | | FGSM $\epsilon = 0.1$ | | |
|---|---|---|---|---|---|---|---|---|---|
| | GMM | Sep | Tied | GMM | Sep | Tied | GMM | Sep | Tied |
| Layer 0 | 76.7 | 75.2 | 77.2 | 69.5 | 69.9 | 64.8 | 85.7 | 86.4 | 83.6 |
| Layer 1 | 85.2 | 84.7 | 73.3 | 94.8 | 95.2 | 95.4 | 92.7 | 92.5 | 90.3 |
| Layer 2 | 78.1 | 78.1 | 51.1 | 78.2 | 78.2 | 74.8 | 88.0 | 88.0 | 80.5 |

FIG. 6

ROBUST MULTIMODAL SENSOR FUSION FOR AUTONOMOUS DRIVING VEHICLES

TECHNICAL FIELD

This disclosure generally relates to techniques for implementing multimodal sensor fusion for autonomous vehicles and, in particular, to the use of neural networks to model and estimate uncertainty with respect to sensors and model data to provide reliable and robust outcomes.

BACKGROUND

Autonomous vehicles (AVs) are equipped with various sensing modalities such as cameras, light detection and ranging (LIDAR), radar, etc., to sense the environment in which they operate. The data captured by these sensors is inherently noisy and uncertain. Having a robust mechanism for fusing these multiple modalities is important, as it can help overcome errors or failures in any single modality.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIG. 5 illustrates a table showing AUPR scores from three different density functions, in accordance with various aspects of the present disclosure.

FIG. 6 illustrates a table showing AUROC scores from three different density functions, in accordance with various aspects of the present disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As noted above, it is important for AVs to have a robust mechanism for fusing the various modalities (e.g. sensor input data) to ensure safe and efficient AV operation. The focus on the aspects described herein is with respect to the ability of DNNs to estimate predictive uncertainty measures, which quantify how much trust should be placed in the DNN results. Conventionally, deep neural networks (DNNs) have been implemented for modality fusion to achieve perception (detection and classification) in AVs. However, DNNs do not provide reliable confidence scores for their outputs. The most popular score used is Softmax, which is known to result in overconfident predictions, especially when the input does not resemble the training data (Out of Distribution (OOD)), or has been crafted to attack and "fool" the network.

Thus, the aspects described herein are directed to techniques for measuring reliable uncertainty scores for DNNs, which are widely used in perception and decision-making tasks in AVs. The aspects described herein are divided into two different sections, which perform uncertainty measurements in this context in two different ways. The content of each of these sections is briefly introduced below, with additional details introduced within each respective section.

In Section I, aspects are discussed related to the use of an uncertainty aware multimodal Bayesian fusion framework for autonomous vehicle (AV) applications. Bayesian DNNs are used in these aspects to model and estimate the uncertainty in the sensed data for each modality. The importance given to a modality during fusion is then based on its estimated uncertainty, which results in reliable and robust outcomes. In Section II, aspects are discussed related to modeling the outputs of the various layers (deep features) with parametric probability distributions once training is completed.

Figure 1:
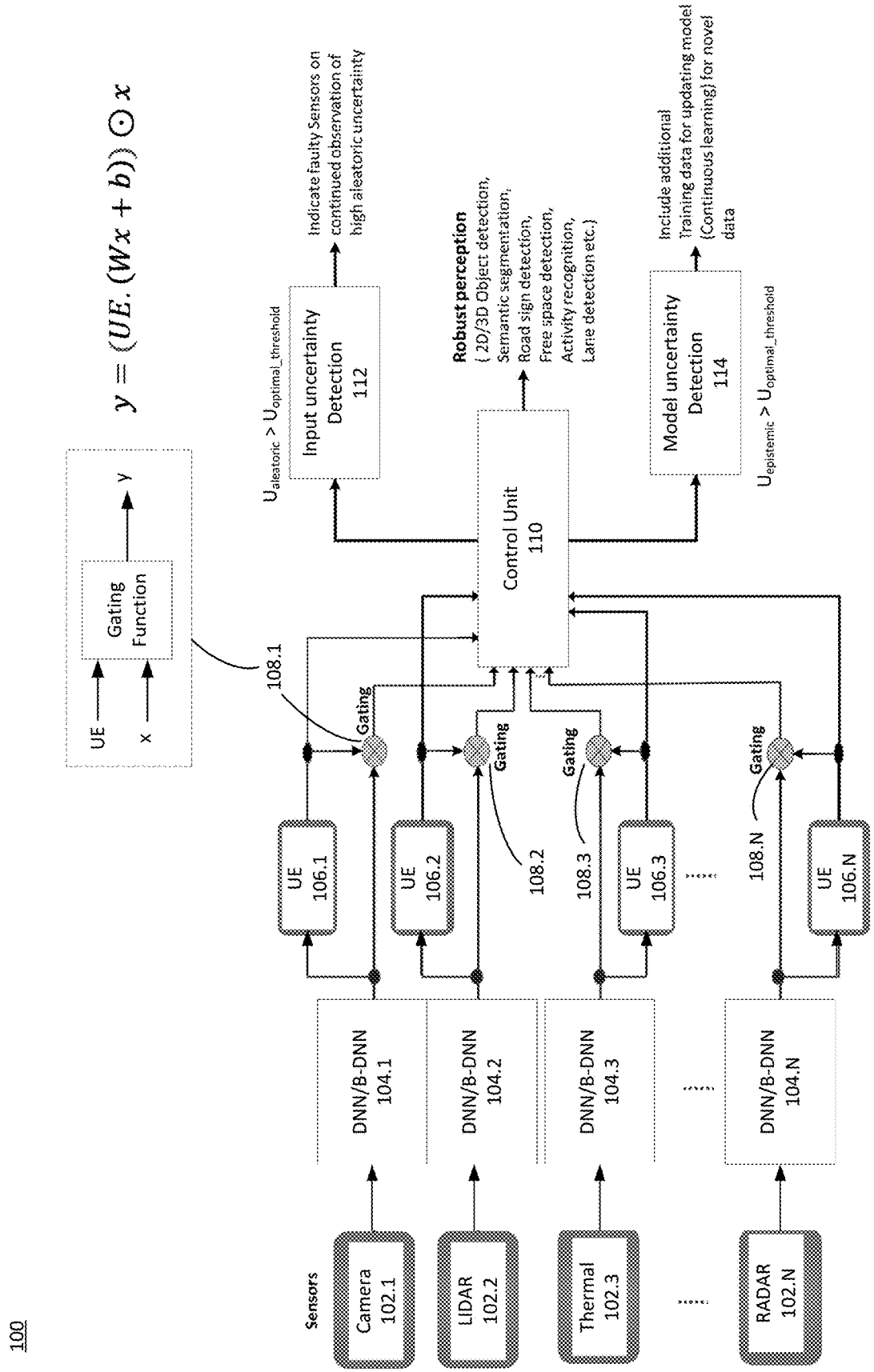
FIG. 1 illustrates an example architecture to enable safer driving controls and path planning, in accordance with various aspects of the present disclosure.

FIG. 1 illustrates an example framework to enable safer driving controls and path planning, in accordance with various aspects of the present disclosure. The framework 100 as shown in FIG. 1 may be implemented as part of an autonomous vehicle, although this is by way of example and not limitation. For instance, the aspects described herein in both Sections I and II may implement the framework 100 in accordance with any suitable type of application that utilizes a fusion of multimodal sensor input data and/or applications that may benefit from the uncertainty estimation of such sensor input data or the resulting environmental model data structure.

The framework 100 as shown in FIG. 1 includes any suitable number N of sensors 102.1-102.N respectively coupled to any suitable number N of neural networks 104.1-104.N. These sensors 102.1-102.N may be part of an AV or other device in which the framework 100 is implemented. For example, the sensors 102.1-102.N may include cameras, LIDAR, thermal sensors, RADAR, etc., as shown in FIG. 1. The aspects described herein may include additional, alternate, or fewer sensors than those shown in FIG. 1 depending upon the particular application and/or implementation of the framework 100.

With continued reference to FIG. 1, the framework 100 implements the neural networks 104.1-104.N, which may be implemented as a neural network or other suitable machine learning system having any suitable architecture and configuration. For example, the neural networks 104.1-104.N may be implemented as Bayesian deep neural networks (B-DNNs) (as described in Section I) or as non-Bayesian deep neural networks (DNNs) (as described in Section II), to calculate an estimated uncertainty with respect to the data received via each respectively coupled sensor. The aspects described herein use DNNs and B-DNNs as examples and not limitation, as the aspects described herein may implement any suitable type of neural network or machine learning to accomplish the various functions as described herein.

As will be further discussed below, the aspects described in both Sections I and II implement the same common framework 100 to realize the various aspects in each case. However, the aspects as discussed in Section I implement, as one example for each of the neural networks 104.1-104.N, a Bayesian DNN, as further discussed below with reference to FIG. 2. The aspects described in further detail in Section II, however, describe an alternate example implementation using non-Bayesian DNNs, and thus rely upon probabilistic feature modeling. In any event, it is noted that because the aspects described in each Section use a similar architecture associated with the framework 100 as shown in FIG. 1, any advantages described with respect to Section I may be equally applicable to Section II, and vice-versa, unless explicitly noted otherwise.

The framework 100 functions as an uncertainty aware framework for robust multimodal (LiDAR, Vision, RADAR, etc.) sensor fusion to enable safer driving controls and path planning. To do so, the framework 100 further includes a control unit (or circuits, circuitry, or block) 110, faulty sensor detection (or input uncertainty detection) block (or circuits, circuitry, or unit) 112, and a model uncertainty block (or circuits, circuitry, or unit) 114. In various aspects, each of the control unit 110, input uncertainty detection block 112, and model uncertainty block 114 may be implemented as part of a common component or as separate components that are in communication with one another. As an example, the control unit 110, input uncertainty detection block 112, and model uncertainty block 114 may be implemented as one or more processors, software (e.g. machine-executable instructions) that is stored or in any suitable memory (not shown, but including a non-transitory computer-readable medium for instance) and executed via one or more processors, hardware components, or combinations of these. As an illustrative example, the control unit 110, input uncertainty detection block 112, and model uncertainty block 114 may be implemented as part of a common electronic control unit (ECU) (or other suitable component) or as part of separate ECUs (or other suitable components) that are part of the AV in which the framework 100 is implemented.

The functionality associated with the neural networks 104.1-104.N, the uncertainty estimation blocks (or circuits, circuitry, or units) 106.1-106.N, and the gating blocks (or circuits, circuitry, or units) 108.1-108.N may likewise be associated with the control unit 110. Additionally or alternatively, the functionality associated with the neural networks 104.1-104.N, the uncertainty estimation blocks 106.1-106.N, and the gating blocks 108.1-108.N may be realized by one or more processors, software (e.g. machine-executable instructions) that is stored or in any suitable memory (not shown, but including a non-transitory computer-readable medium for instance) that is executed via one or more processors, hardware components, or combinations of these, which may be the same components or separate components than those discussed above with respect to the control unit 110, the input uncertainty detection block 112, and the model uncertainty block 114. The various components that form part of the architecture 100 (alternatively referred to as a system) may be coupled and/or communicate with one another in accordance with any suitable type of communication links and/or protocols, such as wired buses, interconnects, wireless links, etc.

Section I—Uncertainty Aware Multimodal Bayesian Fusion Framework for Autonomous Vehicles (AVs)

Conventional solutions for multimodal fusion use early or late fusion by stacking the feature vectors and training the neural network model parameters. These methods learn the relative importance of individual modalities during the training phase, and then fixed fusion parameters are used without consideration to input data distribution during inference time. However, these techniques have drawbacks by assuming fixed weights for the sensor fusion obtained after the training phase. For instance, during the inference stage, this can lead to erroneous decisions when novel input data (i.e. data not present in the training distribution) is observed. It is an arduous process to capture all the environmental conditions for AV applications, hence more robust methods are needed that rely on the most certain sensors during real-world scenarios rather than using point estimates. Moreover, these conventional techniques do not explicitly capture sensor drift or failure in their decisions.

To overcome these issues, the aspects described in this Section are directed to an uncertainty aware multimodal Bayesian fusion framework. In an aspect, Bayesian inference is applied to the variational layers through Monte Carlo sampling on the posterior of model parameters, which provides the predictive distribution to calculate uncertainty estimates. The aspects described in this Section thereby enable robust multimodal sensor fusion based on uncertainty estimates obtained from the Bayesian framework to enable safer driving controls and path planning, resulting in transparent path planning and control decisions. Failures and/or drift of the sensors 102.1-102.N over time can thus be detected based on the uncertainty estimates obtained from the output of the final classification layers of the neural networks 104.1-104.N, which are alternatively referred to as Bayesian deep neural networks (B-DNNs) 104.1-104.N in this Section. The aspects described in this Section also enable cues to select training data for autonomous driving when the trained model is not able to make reliable predictions, which can otherwise result in catastrophic situations. In doing so, the aspects described in this Section reliably predict both data (aleatoric) uncertainty and model (epistemic) uncertainty and facilitate the selection, when applicable, of training data to improve overall model predictions.

With respect to the training data, the B-DNNs 104.1-104.N, the UE blocks 106.1-106.N, the gating blocks 108.1-108.N, the control unit 110, the input uncertainty detection block 112, and the model uncertainty block 114 may, for instance, form part of the same common component (e.g., an ECU) and be trained in accordance with any suitable techniques to constitute a trained model, including known techniques, and using any suitable type of training data depending upon a particular application and implementation. In an aspect, the B-DNNs 104.1-104.N may implement variational layers (e.g. Gaussian distributions). The B-DNNs 104.1-104.N are thus trained to provide output vectors x at each respective final classification layer of the DNN/B-DNN blocks 104.1-104.N. The vectors x may represent categorical distribution data consisting of multiple classes based upon a specific type of sensor data that is fed to each respective B-DNN 104.1-104.N, such as different discrete classes obtained from the classifiers used in accordance with an AV application environmental model data structure, for instance, examples of which may include object recognition (pedestrians, road signs) and image segmentation (drivable vs. non-drivable areas).

Ignoring for the moment the functionality provided by the UE blocks 106.1-106.N and the gating blocks 108.1-108.N, the control unit 110 is trained and configured in accordance with the architecture 100 to receive the categorical distribution output by each of the B-DNNs 104.1-104.N and to generate an appropriate environmental model data structure. For instance, the control unit 110 may be trained in accordance with a set of training data used by the B-DNNs 104.1-104.N that includes various types of multimodal sensor inputs to ensure that new sensor input data enables the control unit 110 to generate an appropriate environmental model data structure. The control unit 110 may function to dynamically generate the environmental model data structure as additional sensor input is received by the B-DNNs 104.1-104.N, which output respective categorical distributions that are received and analyzed via the control unit 110 that fits the trained model. For instance, for an AV application, the training data may include road scenes, signs, pedestrians, objects, etc., that allow the control unit 110 to classify various objects using the categorical distributions output by the B-DNNs 104.1-104.N.

It is noted that neural networks are typically trained to obtain maximum likelihood estimates, and hence SoftMax probability disregards uncertainty around the model parameters and input data, which eventually can lead to predictive uncertainty. The aspects described in this Section reliably handle noisy and novel data by estimating uncertainty (or a confidence measure) for individual modalities (e.g. the sensors 102.1-102.N). In contrast, conventional deep learning models are known to fail in the case of noisy or novel data, leading to overconfident decisions that could be erroneous, as the SoftMax probability does not capture overall model confidence. Thus, to ensure that the control unit 110 accurately continues to generate the environmental model data structure in the event that the sensor data output by the sensors 102.1-102.N are faulty or experience sensor drift, or if the sensor inputs output novel data for which the current training data is not well fit, the aspects described in this Section sample the output of the B-DNNs 104.1-104.N to determine uncertainty metrics. To do so, aspects include the UE blocks 106.1-106.N calculating an uncertainty measurement with respect to the distribution data output by each respective B-DNN 104.1-104.N. These uncertainty estimations are then used to gate each respective sensor's contribution to a final classification result utilized by the control unit 110 to calculate an environmental model data structure.

In an aspect, the UE blocks 106.1-106.N are configured to calculate uncertainty estimates with respect to the sensors 102.1-102.N, which is referred to as aleatoric (input) uncertainty, as well as calculating an uncertainty with respect to how well the input data "fits" the currently trained model, which is referred to as epistemic (model) uncertainty. Thus, the uncertainty estimation blocks 106.1-106.N are configured to sample the distribution data output by each respective B-DNN 104.1-104.N, which utilizes the data provided by each of the individual modalities (i.e. sensors 102.1-102.N). In an aspect, and as further discussed below, the uncertainty estimation calculated by the UE blocks 106.1-106.N is used in accordance with a gating function by the gating blocks 108.1-108.N to gate the sensor data input to the control unit 110. In this way, it is ensured that the control unit 110 receives distribution data that is based upon reliable sensor data (i.e. having a low uncertainty) that also fits the current trained model. The distribution data is then used to generate the environmental model data structure used by the AV to understand and navigate a particular environment. In other words, the UE blocks 106.1-106.N and the gating blocks 108.1-108.N ensure that reliable sensor inputs are implemented by the control unit 110 to construct the environmental model data structure.

To do so, aspects include the UE blocks 106.1-106.N calculating an uncertainty estimation for each sensor 102.1-102.N over various time instances as additional sensor data is received and processed by each respectively coupled B-DNN 104.1-104.N. That is, using the output categorical distribution data of each coupled B-DNN 104.1-104.N, which changes as new input data is received from the sensors 102.1-102.N, the UE blocks 106.1-106.N dynamically calculate (e.g. continuously or in accordance with any suitable sampling period) both aleatoric and epistemic uncertainty values. The gating blocks 108.1-108.N monitor these uncertainty values (or scores) over time to decide whether a particular sensor 102.1-102.N is faulty and/or the data is novel, the latter indicating that the model needs to be re-trained.

In various aspects, the UE blocks 106.1-106.N may calculate the aleatoric uncertainty (AU) and epistemic uncertainty (EU) in accordance with any suitable techniques. For example, the UE blocks 106.1-106.N may calculate the aleatoric uncertainty (AU) in accordance with Equation 1 below and the epistemic uncertainty (EU) in accordance with Equation 2 below as follows:

$$AU := -\frac{1}{T}\sum_{t=1}^{T}\sum_{k} p(y=k|x,w_t)\log p(y=k|x,w_t) \quad \text{Eqn. 1}$$

$$EU := \frac{1}{T}\sum_{t=1}^{T}\sum_{k} p(y=k|x,w_t)\log p(y=k|x,w_t) - \sum_{k}\left(\frac{1}{T}\sum_{t=1}^{T} p(y=k|x,w_t)\right)\log\left(\frac{1}{T}\sum_{t=1}^{T} p(y=k|x,w_t)\right) \quad \text{Eqn. 2}$$

With reference to Eqn. 1 and 2 above, (x,y) represent the input and output of a respectively coupled B-DNN 104.1-104.N, T represents a number of Monte Carlo samples (see Appendix), k represents a class identifier in the multi-class classifier output by a respective B-DNN 104.1-104.N, y∈{1, 2, . . . K}, and $w_t$ represents a weight sampled from a posterior p(w|X,Y).

Again, the aspects described in this Section implement gating blocks 108.1-108.N, which utilize the AU and EU uncertainty estimates provided by each UE block 106.1-106.N to gate the categorical distribution data provided to the control unit 110. To do so, the gating blocks 108.1-108.N may be implemented as any suitable type of component to facilitate this functionality. In an aspect, the gating blocks 108.1-108.N may be implemented as another layer or sub-network in the neural network model utilized by the architecture 100 (e.g., a sub-layer of the B-DNNs 104.1-104.N), which may function to provide a gating function as shown in the detailed inset of FIG. 1. As discussed in further detail in the Appendix, the uncertainty estimates may be calculated by the UE blocks 106.1-106.N using predictive distributions obtained from T Monte Carlo forward passes by sampling the weights from the learned posterior distribution of each respectively coupled B-DNN 104.1-104.N. With continued reference to FIG. 1, the gating function may be represented in Equation 3 below as follows.

$$y=(UE \cdot (Wx+b)) \odot x \qquad \text{Eqn. 3:}$$

Referring to Eqn. 3 above, the UE (uncertainty estimate) represents a scalar, W represents a matrix, b represents vectors, x represents the output vector of a final classification layer of a respectively coupled B-DNN block 104.1-104.N, and y represents the output of the gating function (having the same dimension as x). Moreover, W and b are parameters of a fully connected layer associated with a respectively coupled B-DNN 104.1-104.N, in which W represents weights and b represents a bias. The gating function operates to inhibit the contribution of x that is received and processed by the control unit 110 based on the uncertainty estimate scalar value calculated by a respectively coupled UE block 106.1-106.N. Doing so allows the control unit 110 to perform reliable predictions in real-time for different perception tasks using the generated environmental model data structure such as object detection (e.g. pedestrians, cars, traffic sign detection), free space detection, lane detection, semantic detection, etc. In this way, the inputs from the sensors 102.1-102.N that have lower uncertainty estimate values contribute more to the final predictions calculated by the control unit 110 compared to the sensors 102.1-102.N having higher uncertainty estimate values.

In an aspect, the uncertainty estimates output by the UE blocks 106.1-106.N are also provided to the control unit 110, which monitors the uncertainty estimate values over time and, based on the level of input and model uncertainty estimate values, may indicate faulty sensor measurements or the need for updating the model as new training data needs to be added. For instance, the control unit 110 may be configured to compare the history of the uncertainty estimates associated with all or a subset of the sensors 102.1-102.N. Using this information, the control unit 110 may advantageously identify that data points received from the sensors 102.1-102.N are novel and need to be included in the training stage when higher uncertainty estimates for a subset or majority (e.g. greater than 50%, greater than 75%, etc.) of sensors 102.1-102.N are detected.

In an aspect, the input uncertainty detection block 112 and the model uncertainty detection block 114 may be integrated with, be an extension of, or be separate from the control unit 110, which may be configured to respectively calculate the aleatoric (input) uncertainty and epistemic (model) uncertainty for this purpose. The aleatoric and epistemic uncertainty values may be calculated in any suitable manner to identify whether certain sensors 102.1-102.N are faulty or whether the training data needs to be updated, as shown in FIG. 1. For instance, the aleatoric and epistemic uncertainty values may be time-averaged from those calculated by the UE blocks 106.1-106.N. The uncertainty threshold value $U_{optimal\_threshold}$ may be an adjustable value, a predetermined value, or a value that is otherwise selected based upon the particular application, desired accuracy, and/or test data. In any event, aspects include the control unit 110 identifying when one or more of the sensors 102.1-102.N provide data having an uncertainty that exceeds this accepted uncertainty threshold value $U_{optimal\_threshold}$.

As an example, Table 1 below represents pseudocode for an algorithm that compares the monitored aleatoric uncertainty and epistemic uncertainty values calculated by the UE blocks 106.1-106.N to threshold values, and causing a respective triggered action when the aleatoric uncertainty and epistemic uncertainty values exceed respective predetermined optimal threshold values.

TABLE 1

$U_{optimal\_threshold}$ => Optimal uncertainty threshold based on Accuracy v/s Uncertainty (AvU) measure.
avg_uncertainty_scores => average uncertainty scores over time.
fact => Hyper parameter to weight the senility of the detection mechanism.
  For sensor in range sensor_types:
    If sensor['uncertainty_aleatoric'] > fact * avg_uncertainty_scores['uncertainty_aleatoric']
      sensor['name'] => Faulty sensor
    If sensor['uncertainty_epistemic'] > fact * avg_uncertainty_scores['uncertainty_epistemic']
      sensor['name'] => Update model
    Uncertainty_Score = sensor['uncertainty_aleatoric'] + sensor['uncertainty_epistemic']
    If Uncertainty_Score < $U_{optimal\_threshold}$
      Use the sensor['name'] input in the final prediction.
Update avg_uncertainty_scores In other words, the algorithm as shown in Table 1 may set a weighting parameter (fact) that establishes how far back in time the measured aleatoric uncertainty and epistemic uncertainty values are used. This parameter may be, for instance, obtained experimentally, a predetermined value, adjusted over time, etc. In any event, the algorithm summarized in Table 1 above may continuously, or in accordance with any suitable sampling period, compare the measured aleatoric uncertainty and epistemic uncertainty values to the respective optimum threshold values $U_{optimal\_threshold}$. When the optimum threshold value is exceeded, aspects include the control unit 110 taking appropriate actions in each case.

For instance, aleatoric uncertainty estimates measure the input data uncertainty associated with individual modalities. A consistently high aleatoric uncertainty indicates a faulty sensor. The control unit 110 relies on the data received from the other B-DNNs 104.1-104.N in the aggregate, which utilize the input data from the other sensors 102.1-102.N, to predict and then flag a faulty input sensor if a respective aleatoric uncertainty value exceeds the optimum threshold for one of the sensors 102.1-102.N based upon this comparison among each of the sensors 10.1-102.N. In such a case, the control unit 110 may disregard future inputs from that particular sensor or flag the sensor as being potentially faulty, which may result in an appropriate notification being generated to a user or other suitable system components of the AV in which the architecture 100 may be implemented.

Moreover, because it is difficult to comprehend all corner cases in the training stage, it is important to have an automated methodology for data collection that can flag novel data. The aspects described herein facilitate the identification of high epistemic uncertainty estimates for the majority of sensors 102.1-102.N to indicate that the data points are novel and need to be included in the training stage. To do so, if the epistemic uncertainty value exceeds the optimum threshold, the control unit 110 may determine that the data acquired within some time period is novel and does not fit the current trained model used by the architecture 100. In such a case, then the control unit 110 may initiate a re-training sequence. Such a re-training step incorporates this novel data to update the model parameters to handle similar data in the future.

Figure 2:
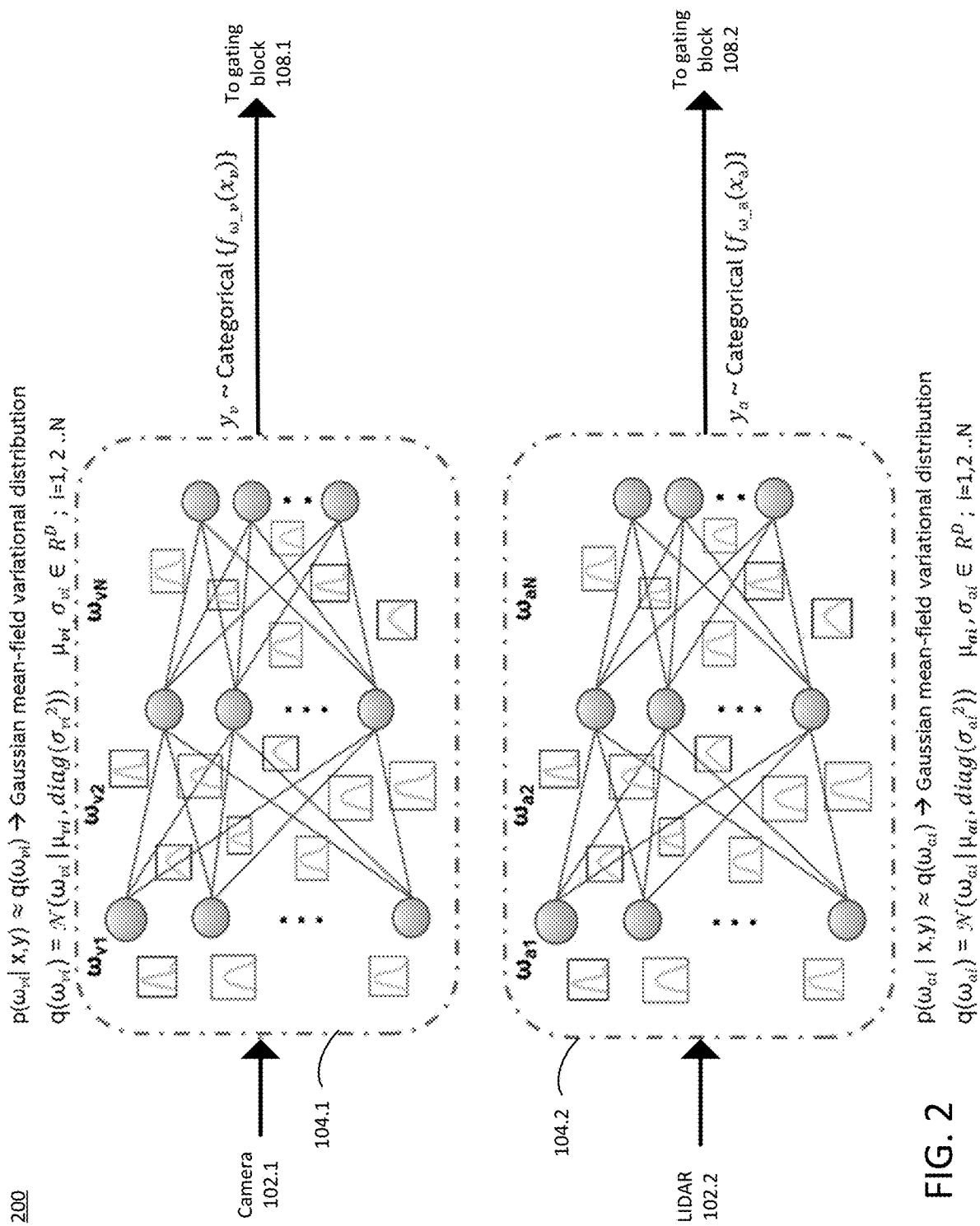
FIG. 2 illustrates an example Bayesian multimodal fusion framework applied to activity recognition, in accordance with various aspects of the present disclosure.

FIG. 2 illustrates an example Bayesian multimodal fusion framework applied to activity recognition, in accordance with various aspects of the present disclosure. As shown in FIG. 2, an uncertainty-aware multimodal fusion is applied in this example to an activity recognition task. Continuing this example, the sensor inputs from sensors 102.1, 102.2 are passed through respective Bayesian models, which are represented as the B-DNNs 104.1, 104.2. The Bayesian models function to model the variational layers with Gaussian distributions for each parameter in the architecture 100. During the inference stage, the uncertainty estimates for individual sensors 102.1-102.N are obtained via the UE blocks 106.1, 106.2 considering predictive distributions obtained from the multiple Monte Carlo forward passes through the network.

In the example shown in FIG. 1, the B-DNNs 104.1, 104.N provide distribution outputs representing different discrete classes such as object recognition (pedestrians, road signs) and image segmentation (drivable vs. non-drivable areas). In the application example shown in FIG. 2, the B-DNNs 104.1-104.N provide a probabilistic interpretation of deep learning models by placing distributions over the model parameters and capturing a posterior uncertainty around the neural network parameters, which is shown in FIG. 2 with respect to two of the DNNs 104.1, 104.N. For instance, the output of B-DNNs 104.1, 104.2 shown in FIG. 2 is a categorical distribution, which represents a discrete probability distribution consisting of multiple classes which represent activity classes in this example. In other words, with continued reference to FIG. 2, a Bayesian inference is applied to the variational layers through Monte Carlo sampling on the posterior of model parameters, which provides the predictive distribution. An uncertainty-aware fusion is then applied in accordance with the gating function as described above to facilitate the control block 110 selecting the most reliable sensor decision. Additional details regarding the operation of Bayesian DNNs, which may be identified with the B-DNNs 104.1-104.N as shown in FIGS. 1 and 2, as well as the method for uncertainty quantification, are included in the Appendix section.

Again, the UE blocks 106.1, 106.2 may calculate uncertainty estimates by sampling the categorical distributions output by each B-DNN 104.1, 104.2 as shown in FIG. 2 using predictive distributions obtained from T Monte Carlo forward passes. This may be calculated, for example, via the UE blocks 106.1, 106.2 sampling the weights from the learned posterior distribution of model parameters implemented via the B-DNNs 104.1-104.N in accordance with Bayes' rule, as further discussed in the Appendix. The uncertainty estimates are thus based upon the weighted average between the two sensors 102.1, 102.2 in this example, which is used to gate the contribution of unreliable sensor data in accordance with the gating function described herein. Again, the uncertainty estimate data associated with each of the sensors 102.1, 102.N may be monitored by the control unit 110 over time to distinguish between aleatoric uncertainty and epistemic uncertainty, and taking specific types of actions when each is detected.

The aspects described in this section improve precision-recall AUC by 10.2% over the non-Bayesian baseline on Moments-in-Time (MiT) audiovisual activity recognition dataset as compared to the non-Bayesian baseline. This approach may be applied, for instance, to Automated Driving datasets (such as BDD/Mapillari/KITTI) in which B-DNN based multi-sensor fusion can significantly improve the overall accuracy of the prediction and path-panning tasks.

In summary, the aspects described in this Section dynamically select training data when the trained model is not able to make reliable predictions that can otherwise result in catastrophic failures. Moreover, the contribution of unreliable sensor input data may be appropriately gated out of decisions made by the control unit 110. Thus, the aspects facilitate the identification of input data uncertainty and result in reliable, improved overall model predictions.

Section II—DNN Uncertainty Estimation for Autonomous Vehicles (AVs) Via Probabilistic Modeling of Deep Features In this Section, the aspects focus on the ability of non-Bayesian deep neural networks (DNNs) to estimate predictive uncertainty measures that quantify how much trust should be placed in the DNN results. The aspects in this Section focus on modeling the outputs of the various layers (deep features) with parametric probability distributions once training is completed. To do so, the aspects described in this Section utilize a technique in which the likelihoods of the deep features with respect to the previously-learned distributions are calculated at the inference stage and then used to derive uncertainty estimates that can discriminate in-distribution samples from Out of Distribution (OOD) samples. As further discussed below, to perform the feature modeling, principal component analysis (PCA) may be implemented to reduce the dimensionality of the features and model the distributions in an appropriate lower-dimensional subspace.

The aspects described in this Section may be particularly advantageous to counter specific types of malicious attacks. For instance, a class of attack that tries to exploit vulnerabilities during the training phase is referred to as data poisoning. Data poisoning is a type of causative attack in which an attacker introduces malicious samples into the training data set to disrupt the integrity of the learning system. This ensures that the learned model functions appropriately on genuine samples, but not on "backdoored" samples that the attacker leverages to get the trained system to behave in any way desired. Out-of-distribution (OOD) data detection, adversarial attack mitigation, and defense against data poisoning attacks are three examples of concrete problems that highlight the need for reliable uncertainty measures for DNNs.

Uncertainty estimation has been a focus of researchers in the Bayesian deep learning field. Conventionally, a neural network's parameters are represented by probability distributions rather than single point values. Parameters are thus learned using variational training, while inference generates a predictive distribution over the outputs, from which various predictive uncertainty measures can be extracted (e.g. predictive mean, entropies, etc.). Other conventional approaches estimate uncertainty directly from a trained (non-Bayesian) DNN, while other approaches utilize probabilities from the Softmax distributions (e.g. generated at the final output layer of the DNNs 104.1-104.N) to detect misclassified or OOD samples. Other conventional techniques include the introduction of a temperature scaling parameter to the Softmax function. However, these approaches fail to evaluate both out-of-distribution and adversarial samples. Moreover, such conventional approaches often require the use of adversarial samples for adversarial attack detection, which is often impossible since such data is not accessible a priori.

Other techniques, in contrast, have adopted a generative approach proposing fitting class-conditional multivariate Gaussian distributions to the pre-trained features of a DNN. The confidence score in accordance with the fitting of class-conditional multivariate Gaussian distributions may be defined as the "Mahalanobis distance" with respect to the closest class conditional distribution. Although this technique accomplishes the evaluation of both out-of-distribution and adversarial samples, it also assumes homoscedastic distributions (i.e. all classes have identical covariance) that is not valid, and leads to sub-optimal performance.

Furthermore, the Bayesian deep learning methods described in Section I above function to provide estimates of predictive uncertainty, but require a substantial computational burden as re-training the network variationally is required, which may be significantly more complex. Moreover, at inference, instead of the typical single forward pass needed to generate the output, multiple stochastic forward passes are required, as discussed above. These significantly increase the complexity and requirements in terms of model representation, computational cost, and memory. For some applications, these requirements may be prohibitive.

Thus, the aspects described in this Section focus on modeling the outputs of the various layers (deep features) of the DNNs 104.1-104.N with parametric probability distributions once training is completed. At inference, the likelihoods of the deep features with respect to the previously learned distributions are calculated, and used to derive uncertainty estimates that can discriminate in-distribution samples from OOD samples. In accordance with the aspects described in this Section, two classes of multivariate distributions are implemented for modeling the deep features in the DNNs 104.1-104.N: Gaussian and a Gaussian mixture. Additionally, prior to feature modeling, aspects include using principal component analysis (PCA) to reduce the dimensions of the feature vectors, which results in modeling distributions in an appropriate lower-dimensional subspace. As a result, the aspects described in this Section advantageously provide robust, reliable, and transparent deep learning systems. For AV applications, this results in a safer AV operation by providing reliable measures of uncertainty.

Moreover, and particularly relevant to this Section, this may be accomplished using a very small computational overhead, especially in comparison to the Bayesian DNN architecture described above in Section I. For instance the aspects described in this Section may share the same architecture 100 as discussed above with respect to Section I. However, as noted above, the aspects described in this Section leverage the use of lower complexity and lower power neural networks that may be implemented as non-Bayesian deep neural networks, and thus the neural networks 104.1-104.N may alternatively be referred to as DNNs 104.1-104.N throughout this Section. To better explain the implementation of the non-Bayesian DNN aspects in this Section, a summary of the overall technique is provided below.

With continued reference to FIG. 1, a one-time offline procedure is first performed once training of the DNNs 104.1-104.N has been completed. This includes first passing all training samples through each DNN 101.1-104.N to extract the desired features. This may include, for instance, using training data in lieu of the sensor input data that is received by the DNNs 104.1-104.N from the sensors 102.1-102.N during ordinary operation. The use of the training data during this training procedure ensures that the control unit 110 may appropriately classify and extract features in accordance with the distribution data received from the DNNs 104.1-104.N. Next, at each model layer, PCA is applied to the extracted features to learn the first m principal components. The number m of features may be selected, for instance, so as to retain a certain variability in the features. The number m of features may be selected, for instance, based upon the particular application, a desired accuracy, etc. For instance, m may represent 99.5% of features to be retained, or a smaller amount thereof (e.g. 95%, 97%, 99%, etc.). Then, the dimensionality of the extracted features is reduced by projecting the features onto the first m principal components. Next, at each model layer, and for each class, a distribution model is chosen (e.g. Gaussian models with shared covariance, Gaussian models with separate covariance, a Gaussian mixture model (GMM), etc.). A particular distribution model may be chosen, for instance, based upon a specific implementation or application. Once chosen, aspects include fitting the corresponding extracted features to the chosen distribution model (i.e. to estimate the model parameters using the features). Once this initial procedure is completed, the DNNs 104.1-104.N and the overall architecture 100 is thus trained in accordance with the aspects as described in this Section, the details of operation of which are further provided below.

Figure 3:
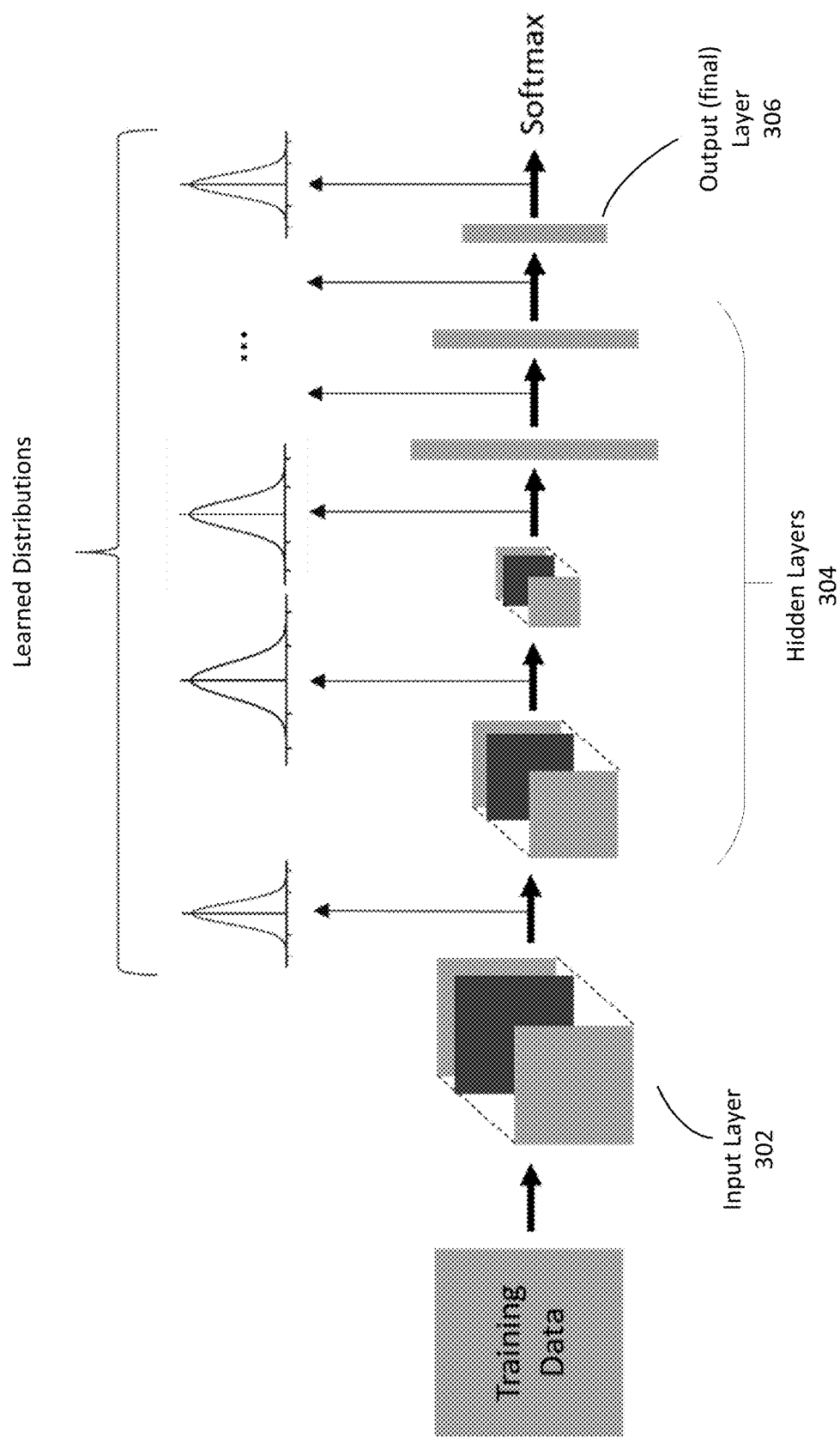
FIG. 3 illustrates an example training stage using per-class parametric distributions fitted to the features vectors at each layer, in accordance with various aspects of the present disclosure.

To do so, reference is made to FIG. 3, which illustrates an example training stage using per-class parametric distributions fitted to the features vectors at each layer, in accordance with various aspects of the present disclosure. The DNN architecture 300 as shown in FIG. 3 may be identified with one or more (or all) of the DNNs 104.1-104.N as shown and described herein with reference to FIG. 1. Thus, the training procedure as discussed herein is provided with respect to a single DNN 104.1-104.N for purposes of brevity, but may be repeated for each of the DNNs 104.1-104.N as shown in FIG. 1. As shown in FIG. 3, the DNN architecture 300 may include an input layer 302, an output layer 306, and any suitable number of hidden layers 306. The DNN architecture 300 may be implemented in accordance with any suitable type of DNN architecture, including known architectures.

With continued reference to FIG. 3, the DNN architecture 300 may receive training data via the input layer 302 in accordance with the offline training procedure noted above. Once the aforementioned training steps are completed, the aspects described in this Section include fitting, for each of the DNNs 104.1-104.N, class-conditional probability distributions to the features of a respective DNN 104.1-104.N. For instance, it is assumed that after the aforementioned offline training phase that the DNNs 104.1-104.N are trained to recognize samples from N number of classes, $\{C_k\}$, $k=1, \ldots, N$. Let $f_i(x)$ denote the output at the $i^{th}$ layer of an example one of the DNNs 104.1-104.N, and $n_i$ its dimension. Thus, by fitting distributions to the deep features induced by training samples, the aspects described in this Section effectively define a generative model over the deep feature space for each of the DNNs 104.1-104.N. In this way, the training stage as shown in FIG. 3 facilitates per-class parametric distributions being fitted to the features vectors at each layer of the DNNs 104.1-104.N. Once the DNNs 104.1-104.N are trained in this manner, the aspects described in this Section enable in-distribution samples to be distinguished from Out of Distribution (OOD) or adversarial samples during subsequent operation during inference. This process is discussed in further detail below with reference to FIG. 4.

Figure 4:
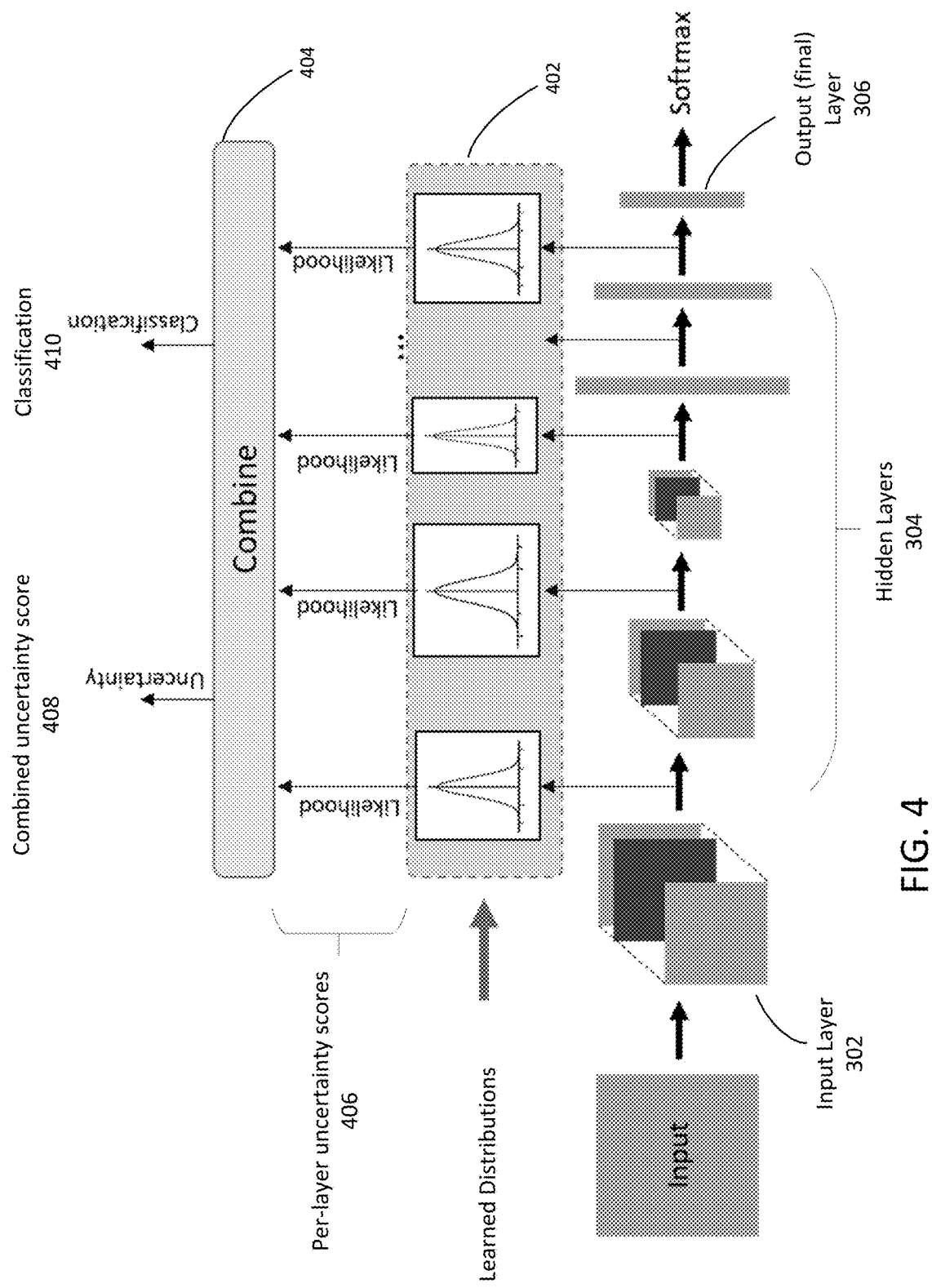
FIG. 4 illustrates an example inference stage using calculated likelihoods of the features with respect to the fitted distributions to derive the per-layer uncertainty score (min log-likelihood), in accordance with various aspects of the present disclosure.

FIG. 4 illustrates an example inference stage using calculated likelihoods of the features with respect to the fitted distributions to derive the per-layer uncertainty score (min log-likelihood), in accordance with various aspects of the present disclosure. As shown in FIG. 4, the DNN architecture 400 corresponds to the DNN architecture 300 as shown in FIG. 3, with FIG. 4 representing the trained DNN. For instance, the DNN architecture 400 includes a set of learned distributions 402 as a result of the training performed as described above with reference to FIG. 3. As shown in FIG. 4, the learned distributions 402 are provided at each layer of the DNN architecture 400. As a result, at inference, aspects include calculating, at each layer, the likelihoods of the feature with respect to the fitted distributions to derive per-layer uncertainty scores 406. These per-layer uncertainty scores may be calculated in any suitable manner, such as a minimum log-likelihood, for instance. In an aspect, the per-layer uncertainty scores 406 are then combined via the combining block 404 to provide a combined uncertainty score 408 and classification 410.

In an aspect, the per-layer uncertainty scores 406 may be combined in any suitable manner and via any suitable component of the architecture 100, with reference to FIG. 1. For instance, the combining block 404 may represent a portion of the controller unit 110, an additional layer or sub-network in the neural network model utilized by the architecture 100 (e.g., a sub-layer of the DNNs 104.1-104.N), the UE blocks 106.1-106.N, etc. The combination of the per-layer uncertainty scores 406 may be made in any suitable manner, such as via logistic regression, for instance, to yield the combined uncertainty score 408. The combined uncertainty score 408 thus indicates a calculated uncertainty estimate associated with the classification 410 output by the DNN architecture 400. This combined uncertainty score 408 may then be used to gate the classification 410 provided to the control unit 110 in accordance with a suitable gating function, as discussed above in Section I.

Moreover, although the aspects described in this Section benefit from the lower complexity and processor-intensive architecture of a non-Bayesian neural network architecture, the aspects described in this Section may achieve identical or similar functionally compared to those described in Section I above. For instance, the combined uncertainty score 408 referenced in FIG. 4 may be identified with the UE estimates for aleatoric uncertainty described herein that may be calculated via the UE blocks 106.1-106.N and used in a similar manner for each of the DNNs 104.1-104.N to provide gating functionality as described above in Section I. This may also include, for instance, monitoring these uncertainty estimate values over time for each of the DNNs 104.1-104.N to calculate aleatoric uncertainty values, and taking the appropriate actions when the aleatoric uncertainty exceeds a respective threshold value (e.g. flagging a sensor as faulty or initiating a re-training of the DNNs 104.1-104.N).

For instance, aspects include the combined uncertainty score 408 for each DNN 104.1-104.N representing the aleatoric uncertainty values as discussed above in Section I. Aspects include the architecture 100 implementing only aleatoric uncertainty values, only epistemic uncertainty values, or a combination of both as described in Section I above. With respect to the epistemic uncertainty detection as noted above in Section I, it is noted that additional modifications may be required to implement this functionality in accordance with a non-Bayesian DNN architecture described in Section II. These modifications may include applying known techniques, for instance, to further calculate the epistemic uncertainty values using the per-layer uncertainty scores 406. As an illustrative example, the epistemic uncertainty may be obtained by varying the parameters associated with the learned distributions 402, or by varying a level of dimensionality reduction applied to the features. This would result in a vector of uncertainty values per-layer instead of a single value, and these may then be aggregated per-layer to calculate the epistemic uncertainty.

Thus, the aspects described in Section II may also include, for instance, monitoring these uncertainty estimate values over time for each of the DNNs 104.1-104.N to calculate aleatoric and/or epistemic uncertainty values, and taking the appropriate actions when each uncertainty exceeds a respective threshold value (e.g., flagging a sensor as faulty or initiating a re-training of the DNNs 104.1-104.N).

With respect to the inference stage described herein with reference to FIG. 4, aspects include performing dimensionality reduction on the features prior to fitting the distributions to the deep features induced by training samples by using principal component analysis (PCA). The reasoning is related to real-world data having an intrinsically low-dimensional structure despite being embedded in very high-dimensional input spaces (i.e., the "Manifold Hypothesis"). In the context of modeling distributions over high-dimensional features, this problem manifests itself as rank-deficiencies of data matrices, making it impossible to estimate the corresponding covariance matrices. To address this, the aspects described herein implement PCA as a principled way to extract the relevant subspace.

To provide an illustrative example, the DNN architecture 400 may, at inference for a given sample, carry a forward pass through the DNN architecture 400 as shown in FIG. 4 to generate the features for that sample. Next, at each layer of the DNN architecture 400, the feature vector is reduced by projecting the feature vector onto the first m principal components that were previously learned during the training stage as discussed above with reference to FIG. 3. Finally, to obtain the uncertainty, a log-likelihood score of the PCA-reduced feature vector is computed with respect to the previously-learned feature distribution (i.e. during the training stage). In an aspect, the log-likelihood scores of the features of a particular sample are calculated with respect to the learned distributions 402 and used to derive the uncertainty estimates. The uncertainty estimates enable the discrimination of in-distribution samples (which should have a high likelihood) from Out of Distribution (OOD) or adversarial samples (which should have a low likelihood).

In an aspect, any suitable combination of multivariate Gaussians and Gaussian mixture models (GMMs) may be implemented to model the distributions at the various layers of the DNN architecture 400. This is advantageous as the features of the outer layers (e.g. the hidden layers 304 closer to the output layer 306) of DNNs tend to be well represented by simpler Gaussian distributions, whereas features of inner-layers (e.g. the hidden layers 304 closer to the input layer 304) need more precise modeling, for which GMMs are a good fit. In either case, the parameters of the distributions are estimated from the training set during the training stage by using maximum likelihood estimation. Moreover, and when GMMs are implemented, the parameters of the distribution are estimated in accordance with a selected number of components in the mixture (i.e. model selection). To do so, aspects include implementing the Bayesian Information Criteria (BIC) to penalize overly complex models.

The aspects described in this Section introduce additional computations than typical DNNs. For instance, learning distributions requires processing of the training set by a fully trained network. However, because this is a one-time offline operation, the primary focus is with respect to the additional online operations that are performed during inference. The amount of processing overhead depends on a number of factors including network architecture, choice of density, and amount of dimensionality reduction via PCA. However, the computations introduced are, for instance, typically matrix-vector multiplications that do not require processor-intensive calculations. Thus, the aspects described in this Section add little processing overhead compared to a forward-pass through the network during inference. It has been validated via appropriate testing and simulation that these additional computations occur much faster than the real-time rate in which new sensor data is processed. The testing of the aspects described in this Section were performed via Python code running on a computer processor.

The benefits of the aspects described in this Section on image features have been experimentally verified by detecting OOD images and adversarially-generated images, using popular DNN architectures on MNIST and CIFAR10 datasets. MNIST and CIFAR10 were used as the in-distribution datasets. For MNIST, FashionMNIST and EMNIST Letters were used as the OOD datasets. For CIFAR10, the SVHN dataset was used and a resized version of the LSUN datasets were used as the OOD datasets. To test against adversarial attacks, the fast gradient sign method (FGSM) attack was used. In all experiments, the parameters of the fitted density functions were estimated from the training split of the in-distribution dataset, while performance metrics (AUPR, AUROC) were calculated on the test split. The OOD detection performance was reported using AUPR and AUROC scores in the tables 500, 600, as shown in FIGS. 5 and 6, respectively. The experiments show that the aspects as described in this Section outperform conventional approaches by a substantial margin; up to 13 percentage points in Area Under the Precision Recall curve (AUPR) and Area Under the Receiver Operating Characteristic curve (AUROC) metrics, indicting a significantly improved detection of OOD and adversarial samples compared to conventional approaches.

EXAMPLES

The following examples pertain to further aspects.

Example 1 is an electronic control unit (ECU), comprising: a plurality of a neural networks, each one of the plurality of neural networks having an input coupled to a respective autonomous vehicle (AV) sensor configured to output distribution data representing a set of different classes used in accordance with an AV application environmental model data structure; a plurality of uncertainty estimation units, each one of the plurality of uncertainty estimation units being configured to calculate an uncertainty estimate value using the distribution data output from a respectively coupled one of the plurality of neural networks, the uncertainty estimate value being with respect to data provided by the AV sensor coupled to the respectively coupled one of the plurality of neural networks; and a control unit configured to gate the distribution data output by each one of the plurality of neural networks in accordance with a respective uncertainty estimate value calculated for each one of the plurality of neural networks, and to generate an environmental model data structure using the gated distribution data.

In Example 2, the subject matter of Example 1, wherein each one of the plurality of a neural networks is a Bayesian deep neural network (B-DNN).

In Example 3, the subject matter of one or more of Examples 1-2, wherein each one of the plurality of a neural networks is a non-Bayesian deep neural network (DNN).

In Example 4, the subject matter of one or more of Examples 1-3, wherein each one of the plurality of uncertainty estimation units is configured to calculate a respective uncertainty estimate value using predictive distributions obtained from multiple Monte Carlo forward passes through a respectively coupled one of the plurality of neural networks by sampling weights from a learned posterior distribution of each respectively coupled one of the plurality of neural networks.

In Example 5, the subject matter of one or more of Examples 1-4, wherein each one of the plurality of uncertainty estimation units is configured to calculate an aleatoric uncertainty value and an epistemic uncertainty value using the distribution data output from each respectively coupled one of the plurality of neural networks.

In Example 6, the subject matter of one or more of Examples 1-5, wherein the control unit is configured to monitor the uncertainty estimate values over time, and to flag an AV sensor as being faulty when a respective aleatoric uncertainty value associated with the AV sensor exceeds a threshold aleatoric uncertainty value.

In Example 7, the subject matter of one or more of Examples 1-6, wherein the control unit is configured to monitor the uncertainty estimate values over time, and to initiate a re-training sequence for the plurality of neural networks when an epistemic uncertainty value associated with one or more of the plurality of neural networks exceeds a threshold epistemic uncertainty value.

Example 8 is an autonomous vehicle (AV) system, comprising: a memory having instructions stored thereon; and one or more processors configured to execute the instructions stored on the memory to: receive sensor data via each one of a respectively coupled autonomous vehicle (AV) sensor and output sets of distribution data, each one of the sets of distribution data representing a set of different classes used in accordance with an AV application environmental model data structure; calculate an uncertainty estimate value for each one of the sets of distribution data; gate each one of the sets of distribution data in accordance with a respectively calculated uncertainty estimate value; and generate an environmental model data structure using the gated distribution data.

In Example 9, the subject matter of Example 8, wherein the one or more processors are configured to output the sets of distribution data in accordance with a Bayesian deep neural network (B-DNN) architecture.

In Example 10, the subject matter of one or more of Examples 8-9, wherein the one or more processors are configured to output the sets of distribution data in accordance with a non-Bayesian deep neural network (DNN) architecture.

In Example 11, the subject matter of one or more of Examples 8-10, wherein the one or more processors are configured to output the sets of distribution data in accordance with a neural network architecture in which each one of the neural networks outputs a respective one of the sets of distribution data, and wherein the one or more processors are configured to calculate a respective uncertainty estimate value for each one of the sets of distribution data using predictive distributions obtained from multiple Monte Carlo forward passes through a respectively coupled one of the plurality of neural networks by sampling weights from a learned posterior distribution of each respectively coupled one of the plurality of neural networks.

In Example 12, the subject matter of one or more of Examples 8-11, wherein the one or more processors are configured to calculate an aleatoric uncertainty value and an epistemic uncertainty value using each one of the sets of distribution data.

In Example 13, the subject matter of one or more of Examples 8-12, wherein the one or more processors are configured to monitor the uncertainty estimate values over time, and to flag an AV sensor as being faulty when a respective aleatoric uncertainty value associated with the AV sensor exceeds a threshold aleatoric uncertainty value.

In Example 14, the subject matter of one or more of Examples 8-13, wherein the one or more processors are configured to output the sets of distribution data in accordance with a neural network architecture in which each one of the neural networks outputs a respective one of the sets of distribution data, and wherein the one or more processors are configured to monitor the uncertainty estimate values over time, and to initiate a re-training sequence for the plurality of neural networks when an epistemic uncertainty value associated with one or more of the plurality of neural networks exceeds a threshold epistemic uncertainty value.

Example 15 is a non-transitory computer readable medium having instructions stored thereon that, when executed by one or more processors, cause the one or more processors to: receive sensor data via each one of a respectively coupled autonomous vehicle (AV) sensor and output sets of distribution data, each one of the sets of distribution data representing a set of different classes used in accordance with an AV application environmental model data structure; calculate an uncertainty estimate value for each one of the sets of distribution data; gate each one of the sets of distribution data in accordance with a respectively calculated uncertainty estimate value; and generate an environmental model data structure using the gated distribution data.

In Example 16, the subject matter of Example 15, wherein the instructions include further instructions that, when executed by one or more processors, cause the one or more processors to output the sets of distribution data in accordance with a Bayesian deep neural network (B-DNN) architecture.

In Example 17, the subject matter of one or more of Examples 15-16, wherein the instructions include further instructions that, when executed by one or more processors, cause the one or more processors to: output the sets of distribution data in accordance with a neural network architecture in which each one of the neural networks outputs a respective one of the sets of distribution data, and calculate a respective uncertainty estimate value for each one of the sets of distribution data using predictive distributions obtained from multiple Monte Carlo forward passes through a respectively coupled one of the plurality of neural networks by sampling weights from a learned posterior distribution of each respectively coupled one of the plurality of neural networks.

In Example 18, the subject matter of one or more of Examples 15-17, wherein the instructions include further instructions that, when executed by one or more processors, cause the one or more processors to calculate an aleatoric uncertainty value and an epistemic uncertainty value using each one of the sets of distribution data.

In Example 19, the subject matter of one or more of Examples 15-18, wherein the instructions include further instructions that, when executed by one or more processors, cause the one or more processors to monitor the uncertainty estimate values over time, and to flag an AV sensor as being faulty when a respective aleatoric uncertainty value associated with the AV sensor exceeds a threshold aleatoric uncertainty value.

In Example 20, the subject matter of one or more of Examples 15-19, wherein the instructions include further instructions that, when executed by one or more processors, cause the one or more processors to: output the sets of distribution data in accordance with a neural network architecture in which each one of the neural networks outputs a respective one of the sets of distribution data, and monitor the uncertainty estimate values over time, and to initiate a re-training sequence for the plurality of neural networks when an epistemic uncertainty value associated with one or more of the plurality of neural networks exceeds a threshold epistemic uncertainty value.

Example 21 is an electronic control means, comprising: a plurality of a neural network means, each one of the plurality of neural network means having an input coupled to a respective sensor means for outputting distribution data representing a set of different classes used in accordance with an autonomous vehicle (AV) application environmental model data structure; a plurality of uncertainty estimation means, each one of the plurality of uncertainty estimation means calculating an uncertainty estimate value using the distribution data output from a respectively coupled one of the plurality of neural network means, the uncertainty estimate value being with respect to data provided by the sensor means coupled to the respectively coupled one of the plurality of neural network means; and a control means for gating the distribution data output by each one of the plurality of neural network means in accordance with a respective uncertainty estimate value calculated for each one of the plurality of neural network means, and generating an environmental model data structure using the gated distribution data.

In Example 22, the subject matter of Example 21, wherein each one of the plurality of a neural network means is a Bayesian deep neural network (B-DNN).

In Example 23, the subject matter of one or more of Examples 21-22, wherein each one of the plurality of a neural network means is a non-Bayesian deep neural network (DNN).

In Example 24, the subject matter of one or more of Examples 21-23, wherein each one of the plurality of uncertainty estimation means calculates a respective uncertainty estimate value using predictive distributions obtained from multiple Monte Carlo forward passes through a respectively coupled one of the plurality of neural network means by sampling weights from a learned posterior distribution of each respectively coupled one of the plurality of neural network means.

In Example 25, the subject matter of one or more of Examples 21-24, wherein each one of the plurality of uncertainty estimation means calculates an aleatoric uncertainty value and an epistemic uncertainty value using the distribution data output from each respectively coupled one of the plurality of neural network means.

In Example 26, the subject matter of one or more of Examples 21-25, wherein the control means monitors the uncertainty estimate values over time, and flags a sensor means as being faulty when a respective aleatoric uncertainty value associated with the sensor means exceeds a threshold aleatoric uncertainty value.

In Example 27, the subject matter of one or more of Examples 21-26, wherein the control means monitors the uncertainty estimate values over time, and initiates a re-training sequence for the plurality of neural network means when an epistemic uncertainty value associated with one or more of the plurality of neural network means exceeds a threshold epistemic uncertainty value.

Example 28 is an autonomous vehicle means, comprising: a memory having instructions stored thereon; and one or more processing means configured to execute the instructions stored on the memory to: receive sensor data via each one of a respectively coupled sensor means and output sets of distribution data, each one of the sets of distribution data representing a set of different classes used in accordance with an autonomous vehicle (AV) application environmental model data structure; calculate an uncertainty estimate value for each one of the sets of distribution data; gate each one of the sets of distribution data in accordance with a respectively calculated uncertainty estimate value; and generate an environmental model data structure using the gated distribution data.

In Example 29, the subject matter of Example 28, wherein the one or more processing means output the sets of distribution data in accordance with a Bayesian deep neural network (B-DNN) architecture.

In Example 30, the subject matter of one or more of Examples 28-29, wherein the one or more processing means output the sets of distribution data in accordance with a non-Bayesian deep neural network (DNN) architecture.

In Example 31, the subject matter of one or more of Examples 28-30, wherein the one or more processing means output the sets of distribution data in accordance with a neural network architecture in which each one of the neural networks outputs a respective one of the sets of distribution data, and wherein the one or more processing means calculate a respective uncertainty estimate value for each one of the sets of distribution data using predictive distributions obtained from multiple Monte Carlo forward passes through a respectively coupled one of the plurality of neural networks by sampling weights from a learned posterior distribution of each respectively coupled one of the plurality of neural networks.

In Example 32, the subject matter of one or more of Examples 28-31, wherein the one or more processing means calculate an aleatoric uncertainty value and an epistemic uncertainty value using each one of the sets of distribution data.

In Example 33, the subject matter of one or more of Examples 28-32, wherein the one or more processing means monitor the uncertainty estimate values over time, and flag a sensor means as being faulty when a respective aleatoric uncertainty value associated with the sensor means exceeds a threshold aleatoric uncertainty value.

In Example 34, the subject matter of one or more of Examples 28-33, wherein the one or more processing means output the sets of distribution data in accordance with a neural network architecture in which each one of the neural networks outputs a respective one of the sets of distribution data, and wherein the one or more processing means monitor the uncertainty estimate values over time, and initiate a re-training sequence for the plurality of neural networks when an epistemic uncertainty value associated with one or more of the plurality of neural networks exceeds a threshold epistemic uncertainty value.

Example 35 is a non-transitory computer readable medium having instructions stored thereon that, when executed by one or more processing means, cause the one or more processing means to: receive sensor data via each one of a respectively coupled sensor means and output sets of distribution data, each one of the sets of distribution data representing a set of different classes used in accordance with an autonomous vehicle (AV) application environmental model data structure; calculate an uncertainty estimate value for each one of the sets of distribution data; gate each one of the sets of distribution data in accordance with a respectively calculated uncertainty estimate value; and generate an environmental model data structure using the gated distribution data.

In Example 36, the subject matter of Example 35, wherein the instructions include further instructions that, when executed by one or more processing means, cause the one or more processing means to output the sets of distribution data in accordance with a Bayesian deep neural network (B-DNN) architecture.

In Example 37, the subject matter of one or more of Examples 35-36, wherein the instructions include further instructions that, when executed by one or more processing means, cause the one or more processing means to: output the sets of distribution data in accordance with a neural network architecture in which each one of the neural networks outputs a respective one of the sets of distribution data, and calculate a respective uncertainty estimate value for each one of the sets of distribution data using predictive distributions obtained from multiple Monte Carlo forward passes through a respectively coupled one of the plurality of neural networks by sampling weights from a learned posterior distribution of each respectively coupled one of the plurality of neural networks.

In Example 38, the subject matter of one or more of Examples 35-37, wherein the instructions include further instructions that, when executed by one or more processing means, cause the one or more processing means to calculate an aleatoric uncertainty value and an epistemic uncertainty value using each one of the sets of distribution data.

In Example 39, the subject matter of one or more of Examples 35-38, wherein the instructions include further instructions that, when executed by one or more processing means, cause the one or more processing means to monitor the uncertainty estimate values over time, and to flag a sensor means as being faulty when a respective aleatoric uncertainty value associated with the sensor means exceeds a threshold aleatoric uncertainty value.

In Example 40, the subject matter of one or more of Examples 35-39, wherein the instructions include further instructions that, when executed by one or more processing means, cause the one or more processing means to: output the sets of distribution data in accordance with a neural network architecture in which each one of the neural networks outputs a respective one of the sets of distribution data, and monitor the uncertainty estimate values over time, and to initiate a re-training sequence for the plurality of neural networks when an epistemic uncertainty value associated with one or more of the plurality of neural networks exceeds a threshold epistemic uncertainty value.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Appendix

This Appendix is provided with respect to the aspects described above in Section I, and further explains the use of Bayesian DNN models. These models may be implemented, for instance, as part of the DNNs 104.1-104.N as shown in FIG. 1 and further described with reference to FIG. 2.

Bayesian DNN Models

Given a training dataset D={x, y} with inputs x={$x_1$, ..., $x_N$} and their corresponding outputs y={$y_1$, ..., $y_N$}, in parametric Bayesian setting we would like to infer a distribution over parameters was a function y=$f_w$ (x) that represents the DNN model. With the posterior for model parameters inferred during Bayesian neural network training, we can predict the output for a new data point by propagating over the model likelihood p(y|x, w) while drawing samples from the learned parameter posterior p(w|D).

Using Bayes' rule, the posterior distribution of model parameters is obtained from model likelihood represented in Equation 4 below as follows:

$$p(w|D) = \frac{p(y|x,w)p(w)}{p(y|x)} \qquad \text{Eqn. 4}$$

Computing the posterior distribution p(w|D) is often intractable. Some of the techniques to achieve an analytically tractable inference include (i) Markov Chain Monte Carlo (MCMC) sampling based probabilistic inference, (ii) variational inference techniques to infer the tractable approximate posterior distribution around model parameters, and (iii) Monte Carlo dropout approximate inference. For the aspects described in Section I herein, any of the above techniques can be used to infer the approximate posterior distribution around the model parameters. As an illustrative example, further detail is provided using Variational Inference.

Variational inference uses a gradient-based optimization technique that approximates a complex probability distribution p(w|D) with a simpler distribution $q_\theta$(w), which is parameterized by variational parameters θ while minimizing the Kullback-Leibler (KL) divergence. Minimizing the KL divergence is equivalent to maximizing the log evidence lower bound (L), as represented below in Equation 5 as follows:

$$L := \int q_\theta(w) \log p(y|x,w) dw - KL[q_\theta(w) \| p(w)] \qquad \text{Eqn. 5:}$$

Predictive distribution over the learned posterior distribution is obtained through multiple stochastic forward passes through the network during the prediction phase while sampling from the posterior distribution of network parameters through Monte Carlo estimators. The predictive distribution of the output y* given new input x* is shown below represented as Equation 6 as follows:

$$p(y^* | x^*, D) = \int p(y^* | x^*, w) q_\theta(w) dw \qquad \text{Eqn. 6}$$

$$p(y^* | x^*, D) \approx \frac{1}{T} \sum_{i=1}^{T} p(y^* | x^*, w_i),$$

$$w_i \sim q_\theta(w)$$

where, T represents the number of Monte Carlo samples.

Uncertainty Estimates

The uncertainty estimates may be calculated using predictive distributions obtained from T Monte Carlo forward passes by sampling the weights from the learned posterior distribution. The epistemic uncertainty may be evaluated using Bayesian active learning by disagreement (BALD), which quantifies mutual information between parameter posterior distribution and predictive distribution in accordance with Equation 7 below as follows:

$$\text{BALD} := H(y^* | x^*, D) - E_{p(w|D)}[H(y^* | x, w)] \qquad \text{Eqn. 7:}$$

where, $H(y^*|x^*, D)$ is the predictive entropy which captures a combination of aleatoric and epistemic uncertainty given by equation 8 below as follows:

$$H(y^* | x^*, D) = -\sum_{i=0}^{K-1} p_{i,\mu} \log p_{i,\mu} \qquad \text{Eqn. 8:}$$

where, $p_{i,\mu}$ is predictive mean probability of $i^{th}$ class from T Monte Carlo samples and K is the total number of output classes.

The weights in fully connected variational layers may be modeled through mean-field Gaussian distribution, and the network may be trained using Bayesian variational inference based on KL divergence. To learn the posterior distribution of model parameters w, the Bayesian DNNs 104.1-104.N may be trained using the variational inference method. In accordance with such aspects, the objective is to optimize log evidence lower bound (ELBO) as the cost function. The model parameters of the fully connected variational layers are parametrized by mean $\mu$ and variance $\sigma^2$, i.e. $q_\theta(w) = N(w|\mu, \sigma^2)$. These parameters of the variational layers are optimized by minimizing the negative ELBO loss.

What is claimed is:

1. An electronic control unit (ECU), comprising:
   a plurality of a neural networks, each one of the plurality of neural networks having an input coupled to a respective autonomous vehicle (AV) sensor and configured to output distribution data representing a set of different classes used in accordance with an AV application environmental model;
   a plurality of uncertainty estimation units, each one of the plurality of uncertainty estimation units being configured to calculate uncertainty estimate values comprising an aleatoric uncertainty value and an epistemic uncertainty value using the distribution data output from a respectively coupled one of the plurality of neural networks, the aleatoric uncertainty value being with respect to data provided by the AV sensor coupled to the respectively coupled one of the plurality of neural networks; and
   a control unit configured to:
      gate a contribution of data provided by each AV sensor to the distribution data output by each one of the plurality of neural networks in accordance with a gating function that utilizes respective uncertainty estimate values calculated for each one of the plurality of neural networks; and
      generate the AV application environmental model using the gated distribution data.

2. The ECU of claim 1, wherein each one of the plurality of a neural networks is a Bayesian deep neural network (B-DNN).

3. The ECU of claim 1, wherein each one of the plurality of a neural networks is a non-Bayesian deep neural network (DNN).

4. The ECU of claim 1, wherein each one of the plurality of uncertainty estimation units is configured to calculate respective uncertainty estimate values using predictive distributions obtained from multiple Monte Carlo forward passes through a respectively coupled one of the plurality of neural networks by sampling weights from a learned posterior distribution of each respectively coupled one of the plurality of neural networks.

5. The ECU of claim 1, wherein the control unit is configured to monitor the uncertainty estimate values over time, and to flag an AV sensor as being faulty when a respective aleatoric uncertainty value associated with the AV sensor exceeds a threshold aleatoric uncertainty value.

6. The ECU of claim 1, wherein the control unit is configured to monitor the uncertainty estimate values over time, and to initiate a re-training sequence for the plurality of neural networks when an epistemic uncertainty value associated with one or more of the plurality of neural networks exceeds a threshold epistemic uncertainty value.

7. An autonomous vehicle (AV) system, comprising:
   a memory configured to store instructions; and
   one or more processors configured to execute the instructions to:
      receive sensor data via each one of a respectively coupled autonomous vehicle (AV) sensor and output sets of distribution data, each one of the sets of distribution data representing a set of different classes used in accordance with an AV application environmental model;
      calculate uncertainty estimate values comprising an aleatoric uncertainty value and an epistemic uncertainty value for each one of the sets of distribution data;
      gate a contribution of data provided by each AV sensor to each one of the sets of distribution data in accordance with a gating function that utilizes respectively calculated uncertainty estimate values for each one of a plurality of neural networks; and
      generate the AV application environmental model using the gated distribution data.

8. The AV system of claim 7, wherein the one or more processors are configured to output the sets of distribution data in accordance with a Bayesian deep neural network (B-DNN) architecture.

9. The AV system of claim 7, wherein the one or more processors are configured to output the sets of distribution data in accordance with a non-Bayesian deep neural network (DNN) architecture.

10. The AV system of claim 7, wherein the one or more processors are configured to output the sets of distribution data in accordance with a neural network architecture in which each one of the neural networks outputs a respective one of the sets of distribution data, and
   wherein the one or more processors are configured to calculate respective uncertainty estimate values for each one of the sets of distribution data using predictive distributions obtained from multiple Monte Carlo forward passes through a respectively coupled one of the plurality of neural networks by sampling weights from a learned posterior distribution of each respectively coupled one of the plurality of neural networks.

11. The AV system of claim 7, wherein the one or more processors are configured to monitor the uncertainty estimate values over time, and to flag an AV sensor as being faulty when a respective aleatoric uncertainty value associated with the AV sensor exceeds a threshold aleatoric uncertainty value.

12. The AV system of claim 7, wherein the one or more processors are configured to output the sets of distribution data in accordance with a neural network architecture in which each one of the neural networks outputs a respective one of the sets of distribution data, and wherein the one or more processors are configured to monitor the uncertainty estimate values over time, and to initiate a re-training sequence for the plurality of neural networks when an epistemic uncertainty value associated with one or more of the plurality of neural networks exceeds a threshold epistemic uncertainty value.

13. A non-transitory computer readable medium configured to store instructions that, when executed by one or more processors, cause the one or more processors to:

receive sensor data via each one of a respectively coupled autonomous vehicle (AV) sensor and output sets of distribution data, each one of the sets of distribution data representing a set of different classes used in accordance with an AV application environmental model;

calculate uncertainty estimate values comprising an aleatoric value and an epistemic uncertainty value for each one of the sets of distribution data;

gate a contribution of data provided by each AV sensor to each one of the sets of distribution data in accordance with a gating function that utilizes respectively calculated uncertainty estimate values for each one of a plurality of neural networks; and generate the AV application environmental model using the gated distribution data.

14. The non-transitory computer readable medium of claim 13, wherein the instructions include further instructions that, when executed by one or more processors, cause the one or more processors to output the sets of distribution data in accordance with a Bayesian deep neural network (B-DNN) architecture.

15. The non-transitory computer readable medium of claim 13, wherein the instructions include further instructions that, when executed by one or more processors, cause the one or more processors to:

output the sets of distribution data in accordance with a neural network architecture in which each one of the neural networks outputs a respective one of the sets of distribution data, and calculate respective uncertainty estimate values for each one of the sets of distribution data using predictive distributions obtained from multiple Monte Carlo forward passes through a respectively coupled one of the plurality of neural networks by sampling weights from a learned posterior distribution of each respectively coupled one of the plurality of neural networks.

16. The non-transitory computer readable medium of claim 13, wherein the instructions include further instructions that, when executed by one or more processors, cause the one or more processors to monitor the uncertainty estimate values over time, and to flag an AV sensor as being faulty when a respective aleatoric uncertainty value associated with the AV sensor exceeds a threshold aleatoric uncertainty value.

17. The non-transitory computer readable medium of claim 13, wherein the instructions include further instructions that, when executed by one or more processors, cause the one or more processors to:

output the sets of distribution data in accordance with a neural network architecture in which each one of the neural networks outputs a respective one of the sets of distribution data, and monitor the uncertainty estimate values over time, and to initiate a re-training sequence for the plurality of neural networks when an epistemic uncertainty value associated with one or more of the plurality of neural networks exceeds a threshold epistemic uncertainty value.

18. The ECU of claim 1, wherein the control unit is configured to generate the AV application environmental model using the gated distribution data such that inputs from AV sensors having lower aleatoric uncertainty values contribute more to predictions calculated by the AV application environmental model compared to AV sensors having higher aleatoric values.

19. The ECU of claim 1, wherein the epistemic uncertainty value is with respect to a novelty of the distribution data output from a respectively coupled one of the plurality of neural networks.

20. The AV system of claim 7, wherein the epistemic uncertainty value is with respect to a novelty of the distribution data output from a respectively coupled one of the plurality of neural networks.

21. The non-transitory computer readable medium of claim 13, wherein the epistemic uncertainty value is with respect to a novelty of the distribution data output from a respectively coupled one of the plurality of neural networks.

* * * * *